UNITED STATES PATENT OFFICE.

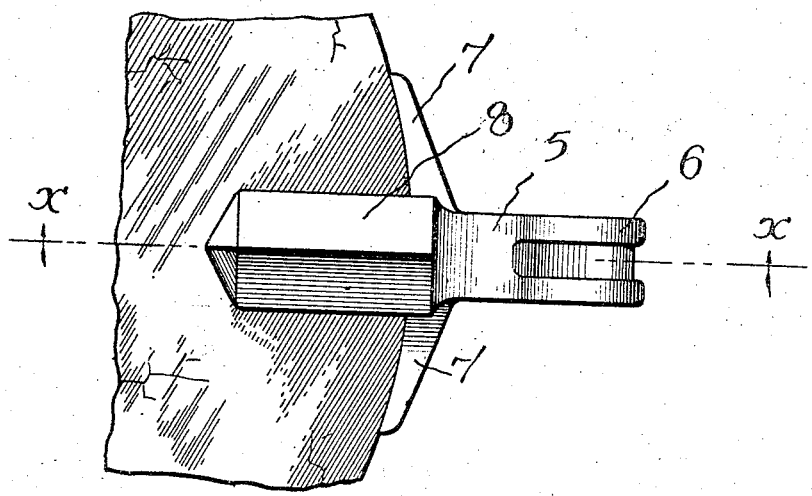
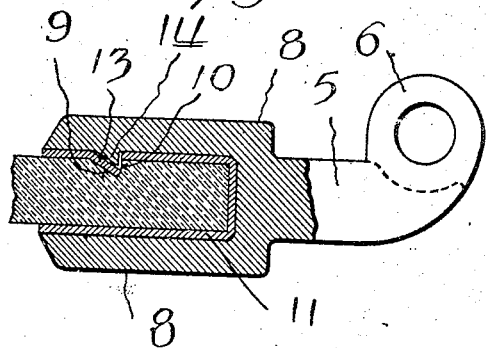
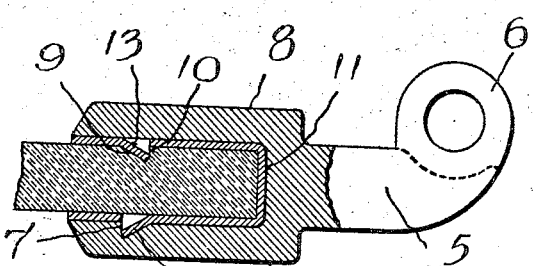
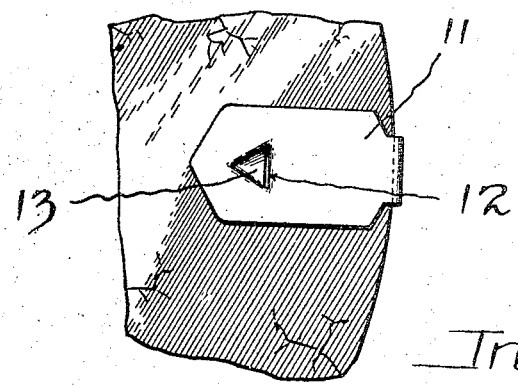

PAUL H. JOHNSTON, OF DAVENPORT, IOWA.

OPHTHALMIC MOUNTING.

1,230,488.  Specification of Letters Patent. Patented June 19, 1917.

Application filed May 11, 1916. Serial No. 96,809.

*To all whom it may concern:*

Be it known that I, PAUL H. JOHNSTON, a citizen of the United States, and a resident of the city of Davenport, county of Scott, and State of Iowa, have invented certain new and useful Improvements in Ophthalmic Mountings, of which the following is a specification.

My present invention relates to improvements in ophthalmic mountings, and has for its special object the provision of effective, and dependable means of extreme simplicity for securing the lenses to the mounting. It will hereafter be seen that the instrumentalities herein disclosed for securing the glasses or lenses to the mounting will secure this connection in the simplest manner, and with little or no weakening of the lens, and can be easily and economically made. Also by employing locking shims of different thicknesses lenses of any thickness may be easily mounted in a comparatively few mountings of different sizes, whereas, heretofore, it has been generally necessary to provide or make mountings particularly for the particular thickness of lens which was to be used.

I attain the above objects by means of the structure illustrated in the accompanying drawing, in which—

Figure 1 is a fragment of an ophthalmic lens with a fitting for securing a temple thereto, the said fitting being a type with which my present invention may be advantageously employed.

Fig. 2 is a section upon line X—X of Fig. 1, showing one form of my invention.

Fig. 3 is also a section on line X—X of Fig. 1, showing a modified form of my invention; and Fig. 4 is a view similar to Fig. 1, with the fitting removed, showing an elevation of a fragment of a lens with the locking shim assembled therewith.

Similar reference characters refer to similar parts throughout the several views.

The fitting, which is secured to the lens, comprises the mounting stud, 5, to which is secured the bridge or temple hinge, 6, as illustrated in the drawing. Extending laterally from the end of the stud are the lens straps, 7, which are adapted to conform to and contact with the periphery or edge of the lens. Lens ears, 8, project from the end of the stud and centrally of the lens straps so as to extend upon each side of the lens opposite each other.

In the surface of the lens which is adapted to be covered by one of the lens ears, is provided a depression or cavity, 9, which is preferably of conical section with the base, 10, thereof disposed toward the periphery of the lens. Disposed between the end of the stud, the lens ears, and the lens is a U-shaped shim, 11, preferably formed from an elastic or spring metal. So as to register with the base, 10, of the conical depression, 9, in the lens when the shim is in position thereon, I prefer to cut or slit the shim as at 12, and the metal adjacent the cut, 12, is depressed to form a conical lateral projection, 13, which conforms with and fits into the conical depression or cavity, 9, of the lens.

While it is obvious that any form of depression or cavity in the lens, and any form of coöperating projection upon the shim may be employed in carrying out my invention, it is believed that the conical form herein particularly described is peculiarly suitable to the practice of my invention, as a conical form of depression in the lens tends to prevent a pivoting of the lens about said depression and secures a maximum grip upon the lens with a minimum weakening thereof, and the conical form of projection upon the shim is extremely easily made and of maximum strength.

The lens ear adjacent the projection, 13, upon the shim, which, with relation to the lens ear is a depression, may be provided with a projection, 14, adapted to extend therein, as shown in Fig. 2; or the shim, 11, may be provided with an outwardly extending extension, 15, adapted to extend into a cavity, 17, provided in the adjacent lens ear, as shown in Fig. 3.

Cement may be used with the herein described construction, but with a shim of a suitable elasticity a detrimental amount of play between the lens and the fitting may be overcome without the use of cement. It should be noted that an absolute rigidity, if such a thing were practically attainable, would probably cause the breaking of a greater number of lenses, while the resilience of my spring locking shim much reduces the strain upon the glass, while permitting the use of lens ears of great relative rigidity.

What I claim as new is:—

1. In combination with a lens, a lens mount, and a shim adapted to interlock respectively with said lens and said mount.

2. In combination with a lens having a depression in a surface thereof, a lens mount including a strap adapted to contact the edge of the lens, and ears adapted to extend oppositely upon either side of said lens, and a shim adapted to extend between and interlock respectively with said lens and said mount.

3. In combination with a lens, a lens mount including ears adapted to extend oppositely upon either side of said lens, and a shim adapted to extend between and interlock respectively with said lens and said mount.

4. In combination with a lens having a conical depression in a surface thereof, with the base of said depression adjacent the periphery of said lens, a lens mount including a strap adapted to contact the edge of the lens and ears adapted to extend oppositely upon either side of said lens, and a shim adapted to extend between and interlock respectively with said lens and said mount.

5. In combination with a lens having a depression in the surface thereof, a lens mount including ears adapted to extend oppositely upon either side of said lens, and a shim adapted to connect said lens and mount and provided with a projection adapted to engage the depression in said lens.

6. In combination with a lens having a depression in the surface thereof, said depression being of conical shape having the base disposed adjacent the periphery of said lens, a lens mount including ears adapted to extend oppositely upon either side of said lens, and a shim adapted to connect said lens and mount and provided with a projection formed by slitting said shim and displacing laterally the material upon one side of said slit, which said projection is adapted to engage the depression in said lens.

7. In combination with a lens having a depression in the surface thereof, a lens mount including ears adapted to extend upon either side of said lens, one of said ears provided with a depression, and a shim having oppositely disposed projections formed by slitting said shim and displacing the metal upon one side of said slits, said projections engaging respectively with the depressions in said lens and ear.

Signed at Davenport, county of Scott and State of Iowa, this 8th day of May, 1916.

PAUL H. JOHNSTON.

Witnesses:
GRACE R. HALL,
WALTER M. BALLOFF.